Jan. 15, 1946.  W. C. PROSS  2,392,998
SEAL
Filed May 23, 1942

INVENTOR.
William C. Pross
BY F. Bascom Smith
ATTORNEY

Patented Jan. 15, 1946

2,392,998

UNITED STATES PATENT OFFICE 2,392,998

SEAL

William C. Pross, Bainbridge, N. Y., assignor to Bendix Aviation Corporation, South Bend, Ind., a corporation of Delaware Application May 23, 1942, Serial No. 444,203

3 Claims. (Cl. 288—1)

This invention relates to seals and more particularly to sealing means adapted for preventing leakage between relatively rotating parts and to methods of making the same.

Various devices have heretofore been proposed for the purpose of preventing fluid leakage along the periphery of a rotating shaft, including devices of the type wherein a sealing flange or abutment is formed on or secured to the shaft and a stationary ring held by suitable means is yieldably pressed into contact with the abutment to achieve a sealing engagement therewith. The material most suitable for the ring in apparatus of this nature has been determined to be solid graphite or carbon but its use has been restricted by the difficulties previously encountered in mounting the ring in the molding means therefor and in preventing seepage through the relatively porous carbon. Prior methods for operatively positioning the ring have resulted in an unsatisfactory bond between the ring and its mount, producing a unit which was not leak-proof and in which, after short use, the carbon ring would become free of its mount. Accordingly, it has been the practice to use materials having inferior sealing characteristics instead of carbon in order to render the sealing units more durable.

One object of the present invention is to provide a novel fluid seal having a carbon or like ring as one of the sealing members thereof wherein a durable, fluid-tight bond is achieved between the ring and its mount and seepage through the carbon is prevented.

Another object is to provide a novel method for mounting the carbon ring in a metallic retaining member in a seal of the above type.

A still further object is to provide a novel method for achieving a strong, leak-proof bond between a metallic element and a carbon or like element.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference being had for this latter purpose to the appended claims.

In the drawing, wherein like reference characters refer to like parts throughout the several views.

Figure 1:
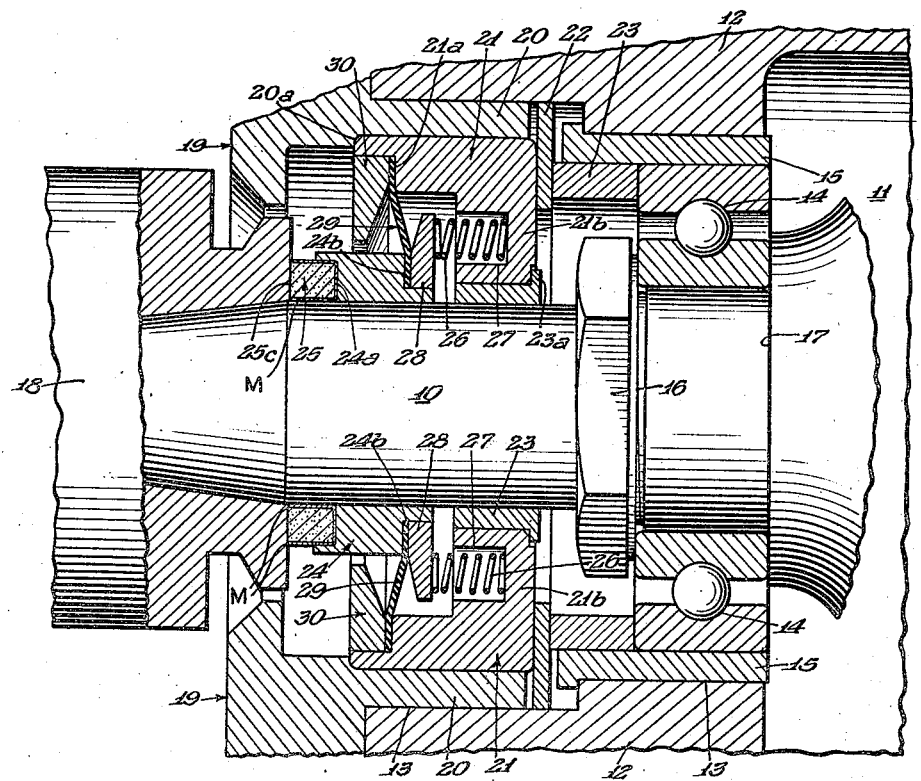
Fig. 1 is a sectional view of one type of fluid seal embodying and made in accordance with the method of the present invention, the section being taken in the plane of the axis of a rotatable shaft around which the seal is operatively mounted.

Referring to Fig. 1, the sealing means embodying the present invention is illustrated, by way of example, as applied to drive shaft 10 of the circuit breaker unit of a magneto for the purpose of preventing oil leakage from a compartment 11 in the magneto housing containing the drive means for said shaft. The invention is also adapted for preventing or materially reducing the leakage of air or other gases from supercharged compartments of magnetos or the like. As shown, shaft 10 extends through an opening 13 in wall 12 of said compartment and is journaled in a ball bearing 14 mounted in a sleeve 15 which is fixed in said opening in any suitable manner. A nut 16 may be threaded on said shaft to engage the inner race of bearing 14, said race being clamped between said nut and a shoulder 17 formed on the shaft. A circuit breaker cam 18 is mounted on the end of shaft 10 and a plate 19 is preferably secured to the magneto housing for supporting the circuit breaker unit (not shown), said plate having an inwardly extending pilot sleeve 20 formed therewith and engaging the wall of opening 13.

To prevent the oil in chamber 11 from escaping therefrom along shaft 10, the novel sealing means are mounted between bearing 14 and cam 18 and comprise an annular housing 21 which is held in fluid-tight engagement with the inner wall of sleeve 20. The outer edge of the left end of said housing, as viewed in Fig. 1, is pressed against an internal shoulder 20a provided in said sleeve and the right end of said housing engages an annular spacer disc 22 which is in turn engaged by a spacer sleeve 23 fitted into sleeve 15 and bearing against the outer race of ball bearing 14. Housing 21 is preferably provided with an internal shoulder 21a and has formed therewith an inwardly extending flange 21b of substantial thickness, said flange having fitted therein a bushing member 23 of brass or like material which has a running clearance around shaft 10. Member 23 may have an external flange 23a formed therewith for engaging the end face of housing 21.

Figure 2:
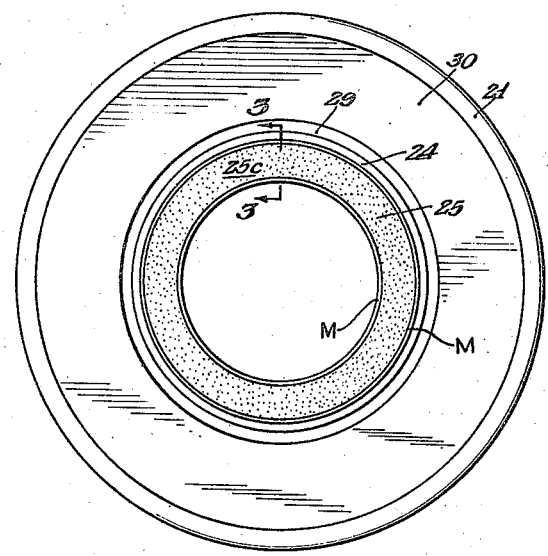
Fig. 2 is a view in elevation of the sealing unit, showing the carbon sealing ring and the mount therefor; and, Fig. 3 is a detail sectional view taken substantially along line 3—3 of Fig. 2, showing a portion of the sealing ring and its mounting on an enlarged scale.

Mounted in housing 21 for slidable movement on shaft 10 is a retaining sleeve 24 and the left-hand end thereof is adapted to project from said housing and to have secured thereon a ring 25 of carbon or the like, the latter being supported in a novel manner to be more fully described hereafter, in a groove 24a provided therefor in the end of said sleeve. Ring 25, in the illustrated embodiment, engages the inner end of cam 18 and is pressed into sealing contact therewith by suitable resilient means, such as springs 26. The latter are mounted in a plurality of recesses 27 provided in flange 21b and engage a flange 28 on said retaining sleeve which is constituted by a ring mounted on said sleeve and rigidly secured thereto, for example, by a press fit or by having a portion of the sleeve spun over into engagement with the flange ring. For purposes to appear hereinafter, three surfaces of sealing ring 25 are covered in a novel manner with a thin metallic coating M, which is shown in Figs. 1 and 2 as consisting of a single layer. Preferably, however, coating M comprises more than one layer of different metals, as is more fully pointed out below.

Figure 3:
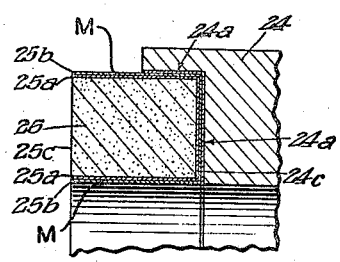

In order to prevent leakage between sleeve 24 and housing 21, an annular diaphragm 29 of a suitable flexible and impervious material, such as a neoprene impregnated fabric, has the inner edge thereof secured between flange member 28 and a shoulder 24b on said sleeve. The outer edge of said diaphragm is clamped between shoulder 21a of housing 21 and a ring 30 which is fixed in the end of said housing. Ring 30, which may be secured in position by having the edge of housing 21 spun into engagement therewith, constitutes an internal flange on said housing and cooperates with flange 28 on sleeve 24 to prevent diaphragm 29 from being unduly stretched and deformed, for example, when cam 18 is removed from shaft 10 and said sleeve is moved outwardly by springs 26. It is desirable for proper and efficient operation of the sealing unit that carbon ring or bushing 25 be securely positioned in member 24 in such a manner as to prevent leakage therebetween, and accordingly a novel means and method are provided for fixing the ring in operative position. As a first step of the method, a coating 25a of metal adapted for easy soldering, such as copper or brass, the former being preferred, is applied over the entire surface of ring 25 to a thickness of approximately .0005'' to .0015''. This is preferably accomplished by immersing the ring in a copper plating solution and electrodepositing thereon a film of copper of the desired thickness. When the copper coating 25a (Fig. 3) has been applied to the ring, the latter is removed from the plating bath and is preferably rinsed with water. The coating 25a may be obtained in any other suitable manner, such as by dipping ring 25 in a copper sulphate solution and keeping the ring immersed therein until the copper plate attains the desired thickness, the length of time required for this dipping operation depending on the concentration of the copper sulphate solution.

The copper-coated carbon ring is then subjected to a second coating operation to provide a film of tin 25b (Fig. 3) over the copper coating. This may be accomplished by dipping the ring in a bath of tin or by immersing the ring in a suitable electrolyte and electrodepositing the film of tin thereon, the latter method having been determined to provide more satisfactory results, particularly if carried out as follows:

1. The ring is dipped for approximately one second in a solution consisting of 3 parts of sulfuric acid and 2 parts of nitric acid and is then rinsed in cold water.
2. It is then placed in a suitable plating bath consisting, for example, of:

|  | Oz./gal. |
|---|---|
| Sodium stannate | 16 |
| Sodium hydroxide | 1 |
| Sodium acetate | 2 |
| Hydrogen perborate | 1/16 |
| Sodium perborate | 1/16 |

During the electorplating process, the above solution is maintained at a temperature of 160° F. and the electrodeposition is carried on for a sufficient length of time to provide a layer of tin approximately .001'' to .002'' in thickness.

3. The ring, when removed from the plating bath, is rinsed in cold water and dried.
4. The ring is thereafter rinsed first in a soap-suds solution and then in hot water.

In order to facilitate the soldering of coated ring 25 into groove 24a, the walls of the latter are also coated with a thin film 24c of tin or other suitable solder. This coating operation may be carried out in any suitable way, such as with a hand soldering iron.

Ring 25 with coating 25b of tin or other suitable solder superposed on layer 25a of copper is prepared for insertion into groove 24a of sleeve 24 by being coated with a suitable soldering flux, such as "Nokorode" solder flux. It is preferable to also apply the flux to the coated surfaces of groove 24a before inserting ring 25 therein. The ring, after insertion, is rigidly secured in position in groove 24a by a soldering operation which may be carried out by the application of heat to the adjoining tin or solder coatings 25b and 24c, care being taken to obtain complete liquation of the solder without exceeding to any material extent the temperature or the quantity of heat necessary to achieve this condition. The soldering heat may be applied in any well-known manner, as for example, by a soldering iron or by electrically heating sleeve 24. It is to be understood that silver or other solder may be used instead of tin or that the desired bonding of the ring to the retaining member may be accomplished immediately after the copper or brass plating operation, as by brazing.

Ring 25 is preferably soldered in sleeve 24 before the latter is operatively assembled with the other parts of the oil seal. It is also possible to carry out the soldering operation with the device completely assembled, but in this event it is advisable to immerse the seal in water to the level of the projecting portion of sleeve 24 and to use a solder having a low melting point in order to prevent damage to diaphragm 29.

When the soldering step is completed, the ring and sleeve assembly is cooled, preferably in air, to avoid staining or distortion of the parts and the excess solder on the exposed surfaces of the carbon ring is removed. Thereafter, surface 25c (Figs. 1 and 3) of ring 25, which is adapted to be pressed into sealing engagement with the end surface of cam 18 or other rotating surface, has the layers of tin and copper removed therefrom to expose a carbon surface for contact with said cam. The carbon sealing surface is preferably lapped smooth and free from scratches, for example, on sand-blasted plate glass, and is then flushed with kerosene before being operatively installed. By reason of the fact that ring 25 is coated with a continuous film of metal on all the surfaces thereof except sealing surface 25c, there cannot be any leakage through the porous carbon as in prior art devices.

There is thus provided a novel method for readily and economically achieving a durable, fluid-tight bond between a metallic member and a carbon or like member, for example, between a carbon sealing ring and the metallic retaining member therefor. A novel sealing unit is also provided for use with relatively rotating or oscillating machine parts and comprises a carbon ring adapted to be yieldably pressed into sealing engagement with a shoulder or flange secured to or formed on a shaft, said ring being mounted in said unit in a novel manner to obtain a long wearing, effective seal and to prevent seepage through the body of the ring.

Although only a single apparatus embodying the present invention has been described and illustrated, it is to be understood that the same is not limited thereto. Moreover, it will now be apparent to those skilled in the art that various changes may be effected in the method of bonding the metallic member to the carbon member without departing from the spirit and scope of the invention as, for example, in the choice of fluxes, solders and specific plating solutions and processes. For a definition of the limits of the invention, reference is had primarily to the appended claims in which the term "soldering" is used generically to designate the bonding of two metallic surfaces by fusion.

What is claimed is:

1. A ring shaped carbon contact element of the type adapted to make sealing contact under pressure and under conditions of relative rotation with the face of a relatively movable cooperating metal sealing member, said carbon contact element having a flat primary contact surface and having every exposed surface except the primary contact surface sealed by metal plating whereby diffusion of sealed fluid through the pores of the carbon is prevented.

2. A ring shaped carbon contact element of the type adapted to make sealing contact under pressure and under conditions of relative rotation with the face of a relatively movable cooperating metal sealing member, said carbon contact element having a flat primary contact surface and having every exposed surface except the primary contact surface sealed by metal plating having a plurality of layers of different metal whereby diffusion of sealed fluid through the pores of the carbon is prevented.

3. A ring shaped carbon contact element of the type adapted to make sealing contact under pressure and under conditions of relative rotation with the face of a relatively movable cooperating metal sealing member, said carbon contact element having a flat primary contact surface and having every exposed surface except the primary contact surface sealed by metal plating having superimposed layers of copper and tin whereby diffusion of sealed fluid through the pores of the carbon is prevented.

WILLIAM C. PROSS.